US012700823B2

(12) United States Patent
DeRamos et al.

(10) Patent No.: US 12,700,823 B2
(45) Date of Patent: Aug. 4, 2026

(54) SYSTEMS AND METHODS FOR REORIENTING SOLAR PANEL ARRAY ON IN-MOTION VEHICLES USING ENERGY COMPARISONS

(71) Applicants: Hyundai Motor Company, Seoul (KR); Kia Corporation, Seoul (KR)

(72) Inventors: John DeRamos, Garden City, MI (US); Amanda Christiana, Ann Arbor, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 147 days.

(21) Appl. No.: 18/606,464

(22) Filed: Mar. 15, 2024

(65) Prior Publication Data

US 2025/0293633 A1 Sep. 18, 2025

(51) Int. Cl.
| | |
|---|---|
| *B60L 53/00* | (2019.01) |
| *B60L 53/51* | (2019.01) |
| *H02S 20/32* | (2014.01) |

(52) U.S. Cl.
CPC .............. *H02S 20/32* (2014.12); *B60L 53/51* (2019.02)

(58) Field of Classification Search
CPC ................................ H02S 20/32; B60L 53/51
USPC .......................................................... 701/49
See application file for complete search history.

(56) References Cited

U.S. PATENT DOCUMENTS

| | | | | |
|---|---|---|---|---|
| 2008/0100258 A1* | 5/2008 | Ward | ................... | H01M 10/465 |
| | | | | 320/101 |
| 2016/0141913 A1* | 5/2016 | Wheatley | .............. | H02J 7/0044 |
| | | | | 320/101 |
| 2017/0219374 A1* | 8/2017 | Sitarski | .................. | G01C 21/34 |
| 2023/0173898 A1* | 6/2023 | Dawson | ................ | B60R 16/033 |
| | | | | 296/100.06 |
| 2023/0391318 A1* | 12/2023 | Pursifull | ............... | B60W 40/02 |
| 2024/0171120 A1* | 5/2024 | Miyashiro | ............... | H02S 40/32 |

FOREIGN PATENT DOCUMENTS

IN 457922 10/2023

* cited by examiner

*Primary Examiner* — Jelani A Smith
(74) *Attorney, Agent, or Firm* — Fox Rothschild LLP

(57) ABSTRACT

A reconfigurable solar panel array system and methods of use are provided. The reconfigurable solar panel array system may comprise a reconfigurable solar panel array, a bending mechanism, and a computing device, comprising a processor and a memory. The system may be configured to, when a vehicle is in motion, determine whether an amount of sunlight is above a threshold, calculate one or more trip segments of a navigation route of the vehicle, and, for a trip segment, of the one or more trip segments, calculate an optimal position of the reconfigurable solar panel array relative to a direction of sunlight, determine whether a current position of the reconfigurable solar panel array is different from the optimal position, determine whether an estimated trip segment energy is greater than an adjustment energy, and, adjust the position of the reconfigurable solar panel array to the optimal position.

20 Claims, 6 Drawing Sheets

SYSTEMS AND METHODS FOR REORIENTING SOLAR PANEL ARRAY ON IN-MOTION VEHICLES USING ENERGY COMPARISONS

BACKGROUND

Technical Field

Embodiments of the present disclosure relate to systems and methods for reorienting solar panel arrays on in-motion vehicles using energy comparisons.

Background

Electric vehicles (EVs) and, in particular, electric trucks (EV trucks), may lose anywhere from 30% to 50% of their driving range when towing a trailer. For example, an EV Truck with a range of 320 miles may only be able to drive 160 miles up to max load capacity.

When towing, the driving range may be significantly reduced due to the increased weight of the load, the aerodynamic drag, the terrain, the driving conditions, and aggressive driving habits. Cold weather conditions may also lower an EV truck's driving range up to 40%. The overall effect of cold temperatures may reduce a high voltage battery's state of charge.

In addition to the factors which affect EV driving range, drivers of EVs also have to consider where to charge their EVs. Presently, there are present around 16,822 Tesla® superchargers along with 126,500 Level 2 and 10,000 Level 3 charging ports, compared to around 1,200,000 fuel pumps from 168,000 gasoline stations in the United States.

The average person towing a camper would normally be driving long distances to their vacation destination. However, during these long distances, the availability of charging stations may be limited. Not only can the location between charging stations vary, but the voltage outputs of different charging stations may vary, as well. The standard charging station outlets does not always provide DC Fast Charge so the wait time will be much longer before they reach their intended vacation spot. Solar panels can extend the range and reduce amount of stops for battery charging. For at least these reasons, there is a need for additional charging means to supplement the existing charging network, and the need for additional charging is even more significant (1) for EVs that are towing and/or (2) driving during cold weather due to the additional range reductions which occur in these scenarios.

SUMMARY

According to an object of the present disclosure, a reconfigurable solar panel array system is provided. The reconfigurable solar panel array system may comprise a reconfigurable solar panel array comprising one or more solar panels. The reconfigurable solar panel array may be secured at a first end and secured at a second end and may be configured to charge a battery of a vehicle. The reconfigurable solar panel array system may comprise a bending mechanism configured to adjust a position of the reconfigurable solar panel array and a computing device, comprising a processor and a memory. The memory may be configured to store instructions that, when executed by the processor, cause the processor to, when the vehicle is in motion, determine whether an amount of sunlight is above a threshold, when the amount of sunlight is above the threshold, calculate one or more trip segments of a navigation route of the vehicle, and, for a trip segment, of the one or more trip segments, calculate an optimal position of the reconfigurable solar panel array relative to a direction of sunlight, determine whether a current position of the reconfigurable solar panel array is different from the optimal position, when the current position of the reconfigurable solar panel array is different from the optimal position, determine whether an estimated trip segment energy is greater than an adjustment energy, and, when the estimated trip segment energy is greater than the adjustment energy, adjust the position of the reconfigurable solar panel array to the optimal position. The trip segment energy is a predicted energy that would be generated by the reconfigurable solar panel array at the optimal position during the trip segment. The adjustment energy is a predicted maximum amount of power needed to fully adjust a position of the reconfigurable solar panel array.

According to an exemplary embodiment, the reconfigurable solar panel array system may further comprise a clear outer shell configured to encase the reconfigurable solar panel array.

According to an exemplary embodiment, the bending mechanism may comprise a cylinder positioned under the reconfigurable solar panel array, and an actuator configured to move the cylinder between the first end and the second end. The cylinder may be configured to adjust a position of the reconfigurable solar panel array relative to the direction of sunlight.

According to an exemplary embodiment, the instructions, when executed by the processor, may be configured to cause the processor to determine whether the vehicle is in motion.

According to an exemplary embodiment, the instructions, when executed by the processor, may be configured to, when the vehicle is not in motion, cause the processor to calculate an optimal position of the reconfigurable solar panel array relative to a direction of sunlight, determine whether the optimal position is different from a current position of the reconfigurable solar panel array, and, when the optimal position is different from the current position, adjust a position of the reconfigurable solar panel array to the optimal position.

According to an exemplary embodiment, the optimal position of the reconfigurable solar panel array relative to the direction of sunlight may be based on input from one or more sensors coupled to the vehicle.

According to an exemplary embodiment, the one or more sensors may be selected from the group consisting of; one or more LiDAR sensors; one or more radar sensors; one or more cameras; one or more position determining sensors; one or position orientation sensors; one or more light sensors; and one or more motion sensors.

According to an exemplary embodiment, for each trip segment, of the one or more trip segments, an average traveling direction may fall within a predetermined threshold traveling direction.

According to an exemplary embodiment, the reconfigurable solar panel array system may comprise a rotation mechanism configured to rotate the reconfigurable solar panel array.

According to an exemplary embodiment, the reconfigurable solar panel array system may comprise the vehicle.

According to an exemplary embodiment, the vehicle may be an electric vehicle truck (EV truck), and the solar panel array may be positioned on a truck bed cap of the EV truck.

According to an object of the present disclosure, a method for reorienting solar panel arrays is provided. The method may comprise, when a vehicle is in motion, determining, using a computing device comprising a processor and a memory, whether an amount of sunlight is above a threshold, when the amount of sunlight is above the threshold, calculating one or more trip segments of a navigation route of the vehicle, and, for a trip segment, of the one or more trip segments, calculating an optimal position of a reconfigurable solar panel array relative to a direction of sunlight. The reconfigurable solar panel array may comprise one or more solar panels, may be secured at a first end and secured at a second end, and may be configured to charge a battery of the vehicle. The method may comprise, for the trip segment, determining whether a current position of the reconfigurable solar panel array is different from the optimal position, when the current position of the reconfigurable solar panel array is different from the optimal position, determining whether an estimated trip segment energy is greater than an adjustment energy, and, when the estimated trip segment energy is greater than the adjustment energy, adjusting the position of the reconfigurable solar panel array to the optimal position, using a bending mechanism configured to adjust a position of the reconfigurable solar panel array. The trip segment energy is a predicted energy that would be generated by the reconfigurable solar panel array at the optimal position during the trip segment. The adjustment energy is a predicted maximum amount of power needed to fully adjust a position of the reconfigurable solar panel array.

According to an exemplary embodiment, the bending mechanism comprises a cylinder positioned under the reconfigurable solar panel array, and an actuator configured to move the cylinder between the first end and the second end. The cylinder may be configured to adjust a position of the reconfigurable solar panel array relative to the direction of sunlight.

According to an exemplary embodiment, the method may comprise determining, using the computing device, whether the vehicle is in motion.

According to an exemplary embodiment, the method may comprise, using the computing device calculating an optimal position of the reconfigurable solar panel array relative to a direction of sunlight and determining whether the optimal position is different from a current position of the reconfigurable solar panel array.

According to an exemplary embodiment, the method may comprise, when the optimal position is different from the current position, adjusting, using the bending mechanism, a position of the reconfigurable solar panel array to the optimal position.

According to an exemplary embodiment, the optimal position of the reconfigurable solar panel array relative to the direction of sunlight may be based on input from one or more sensors coupled to the vehicle.

According to an exemplary embodiment, the one or more sensors may be selected from the group consisting of: one or more LiDAR sensors; one or more radar sensors; one or more cameras; one or more position determining sensors; one or position orientation sensors; one or more light sensors; and one or more motion sensors.

According to an exemplary embodiment, for each trip segment, of the one or more trip segments, an average traveling direction may fall within a predetermined threshold traveling direction.

According to an exemplary embodiment, the vehicle is an EV truck and the solar panel array is positioned on a truck bed cap of the EV truck.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1:
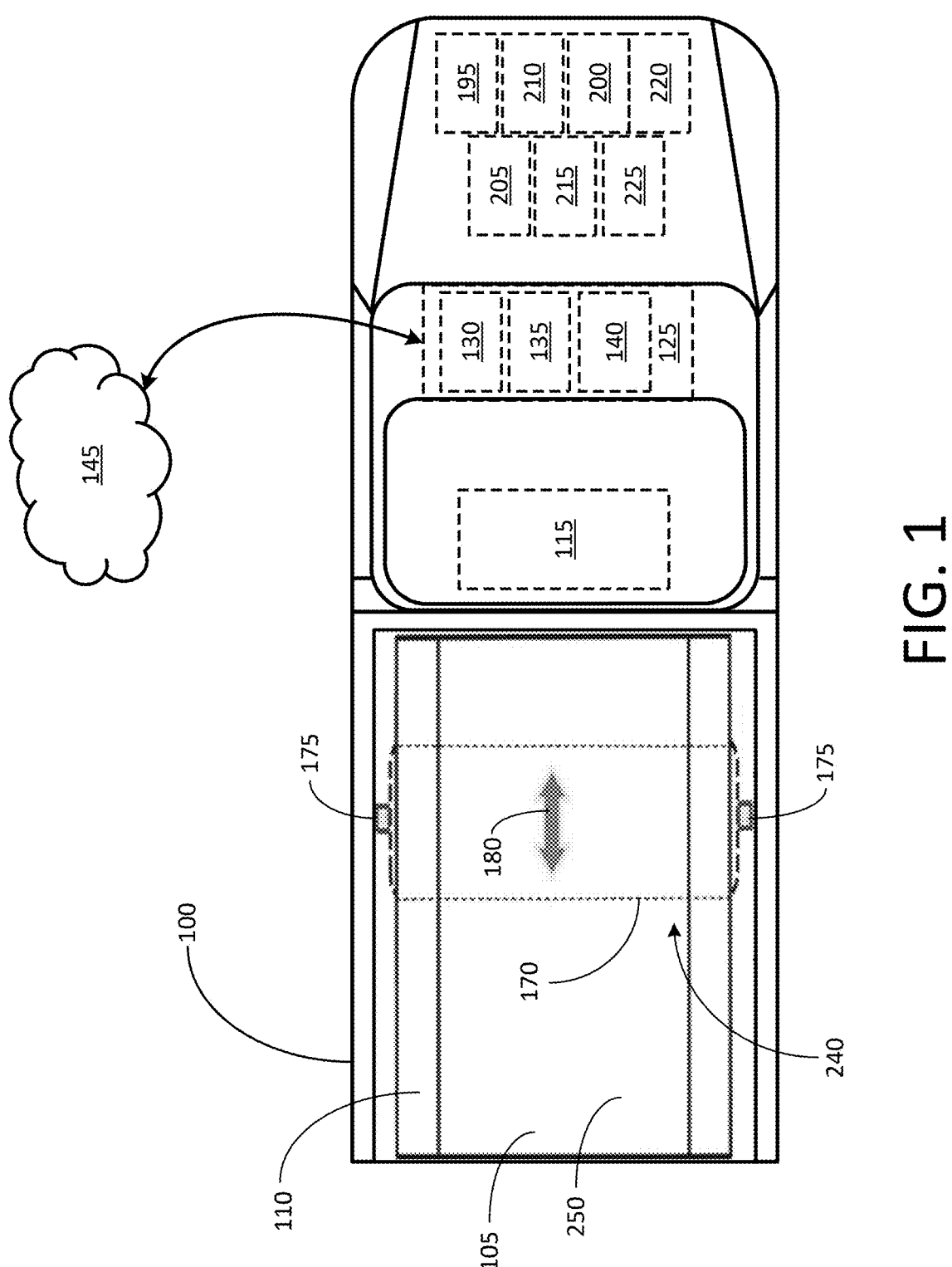
FIG. 1 illustrates an electric vehicle truck (EV truck) comprising a reconfigurable solar panel array system, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

The actual range of a battery electric vehicle (BEV) is highly influenced by external/environmental conditions, such as, e.g., temperature, wind, road conditions (e.g., road material, smoothness, etc.), speed, whether the BEV is climbing or descending hills, whether the BEV is towing, and and/or other conditions.

Solar panels may be mounted on an electric vehicle (EV) to charge the EV's battery while the EV drives. A solar panel's orientation to the Sun is constrained by the EV's direction of travel. The EV's direction of travel will typically not match solar panel's optimum orientation to the Sun for solar energy generation. Actuators may reorient the solar panel on the EV. However, actuator operation will consumer electrical charge. Thus, there is a need to ensure the reorienting of solar panels that does not consume more energy than the solar panels will generate in the new orientation.

According to exemplary embodiments, systems and methods for reorienting solar panel arrays on in-motion vehicles using energy comparisons are provided.

Figures 2, 3:
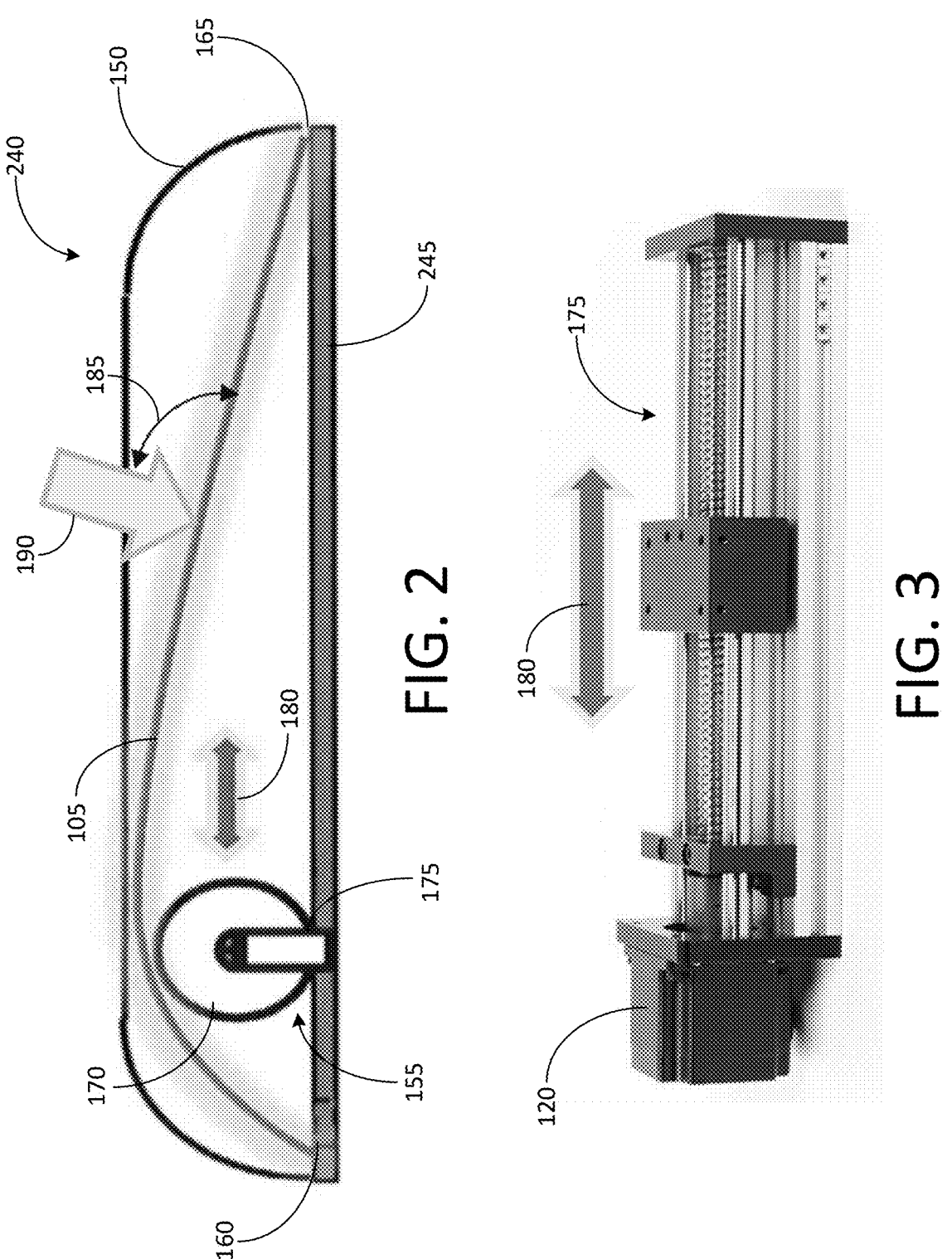
FIG. 2 illustrates a side view of a reconfigurable solar panel array system, according to an exemplary embodiment of the present disclosure.
FIG. 3 illustrates an upper side view of an actuator, according to an exemplary embodiment of the present disclosure.
Figures 4A, 4B:
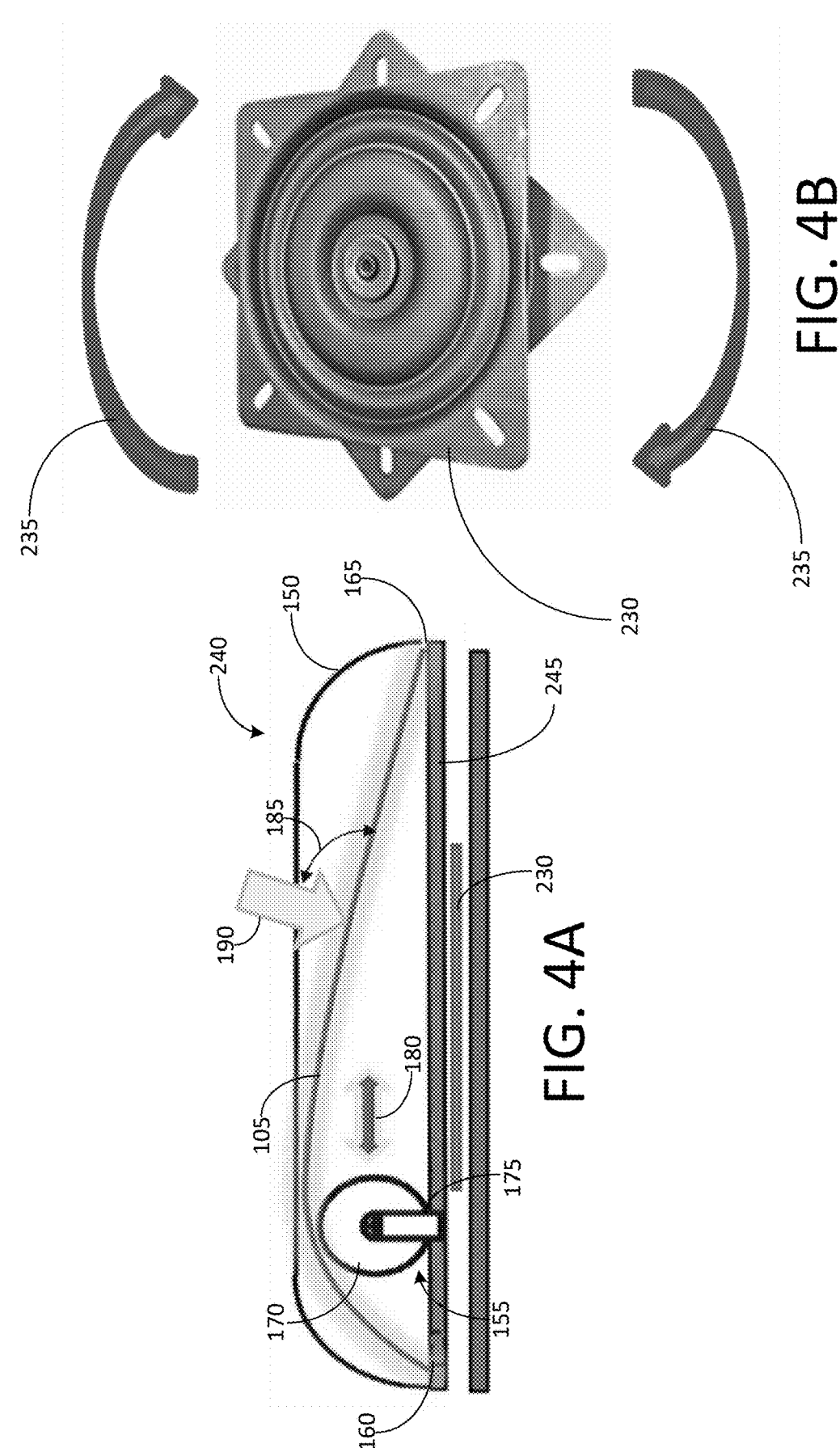
FIG. 4A illustrates a side view of a reconfigurable solar panel array system, according to an exemplary embodiment of the present disclosure.
FIG. 4B illustrates an upper perspective view of a rotation mechanism, according to an exemplary embodiment of the present disclosure.

Referring now to FIGS. 1-2, a top view (FIG. 1) of a vehicle (e.g., an electric vehicle truck (EV truck)) 100 comprising a reconfigurable solar panel array system 240 is illustratively depicted, and a side view (FIG. 2) of a reconfigurable solar panel array system 240 is illustratively depicted, in accordance with several exemplary embodiments of the present disclosure. According to an exemplary embodiment, the reconfigurable solar panel array 105 may comprise one or more solar panels 250.

According to an exemplary embodiment, the solar panel array 105 may be installed on a truck bed cap 110 of the EV truck 100. It is noted, however, that the solar panel array 105 may be installed on other suitable locations of the EV truck 100 while maintaining the spirit and functionality of the present disclosure. According to an exemplary embodiment, the reconfigurable solar panel array 105 may be flexible, bendable, and/or reconfigurable in one or more other suitable ways.

According to an exemplary embodiment, the solar panel array system 240 may comprise a reconfigurable solar panel array 240 configured to charge a high voltage battery 115 of the EV truck 100 while on the road and parked outside, aiding in increasing an overall driving range distance of the EV truck 100. According to an exemplary embodiment, the reconfigurable solar panel array 105 may be configured to change shape, direction, and/or orientation depending on the position of the Sun. The reconfigurable solar panel array 105 may comprise a motor 120 configured to power a bending mechanism 155 (e.g., a sliding mechanism) configured to bend/distort/reconfigure the reconfigurable solar panel array 105 to change/adjust a position, orientation, and/or shape of the reconfigurable solar panel array 105. Reconfigurable solar panel arrays change angles faster and more efficiently than rigid solar panels. According to an exemplary embodiment, an increase in a surface of the reconfigurable solar panel array 105 may raise an all-electric range of a vehicle.

The EV truck may comprise a computing device 125 comprising a processor 130, a memory 135, and/or a user interface 140 (e.g., a graphical user interface), The computing device 125 may be configured to send and/or receive commands/data/etc. via one or more external systems via wired and/or wireless connection (e.g., via the cloud 145). The memory 135 may be configured to store programming instructions that, when executed by the processor 130, may be configured to cause the processor 130 to perform one or more tasks such as, e.g., causing the motor 120 to bend/distort the reconfigurable solar panel array 105 using an algorithm based on a GPS location, the weather, an angle of the EV truck 100, a speed of the EV truck 100, a position of where the EV truck 100 is parked, and/or other suitable factors. According to an exemplary embodiment, the motor 120 may be configured to bend/distort the reconfigurable solar panel array 105 to cause the reconfigurable solar panel array 105 to be positioned at an angle to face and receive the most optimal sunlight.

According to an exemplary embodiment, the reconfigurable solar panel array 105 may be configured to flex up to 240 degrees. According to an exemplary embodiment, the reconfigurable solar panel array 105 may have a thickness of less than one inch (e.g., a thickness of 0.1 inches). It is noted, however, that other suitable reconfigurable solar panel arrays having differing flexibility limits and/or thicknesses may be incorporated, while maintaining the spirit and functionality of the present disclosure.

According to an exemplary embodiment, the reconfigurable solar panel array 105 may be encased is a clear outer shell 150. The clear outer shell 150 may be configured to protect the reconfigurable solar panel array 105. According to an exemplary embodiment, a shape of the clear outer shell 150 may be configured to not significantly affect the aerodynamics of the EV truck 100.

According to an exemplary embodiment, the reconfigurable solar panel array 105 may be secured at a first fixed end 160 and at a second fixed end 165, with the reconfigurable solar panel array 105 effectively draped over the bending mechanism 155. According to an exemplary embodiment, the bending mechanism 155 may comprise a cylinder 170 coupled to an actuator 175 configured to move the cylinder 170 along in a direction 180 between the first fixed end 160 and the second fixed end 165. According to an exemplary embodiment, the movement of the bending/sliding mechanism 155 changes an angle between the reconfigurable solar panel array 105 and a direction 190 of the Sun to an optimized angle 185 to optimize solar energy generation by the reconfigurable solar panel array 105. According to an exemplary embodiment, the actuator 175 may comprise a screw-type actuator 175 as shown, e.g., in FIG. 3. It is noted, however, that other suitable actuators 175 may be incorporated while maintaining the spirit and functionality of the present disclosure.

According to an exemplary embodiment, the reconfigurable solar panel array 105 and/or the bending mechanism 150 may be positioned on a surface 245. The surface 245 may be a truck bed cap 110 and/or other suitable surface. According to an exemplary embodiment, the surface 245 may be positioned above a truck bed cap 110 and/or other suitable surface.

According to an exemplary embodiment, the vehicle 100 may comprise one or more sensors such as, for example, one or more LiDAR sensors 195, one or more radio detection and ranging (RADAR) sensors 200, one or more cameras 205, one or more position determining sensors 210 (e.g., one or more Global Positioning System devices and/or other suitable navigation sensors), one or position orientation sensors 215, one or more light sensors 220, and/or one or more motion sensors 225, among other suitable sensors. According to an exemplary embodiment, the one or more sensors may be in electronic communication with one or more computing devices 125. The one or more computing devices 125 may be separate from the one or more sensors and/or may be incorporated into the one or more sensors. According to an exemplary embodiment, the one or more sensors may comprise one or more imaging sensors (e.g., the one or more LiDAR sensors 195, the one or more cameras 205, the one or more radar sensors 200, and/or other suitable imaging sensors) configured to function as an ADAS. According to an exemplary embodiment, the ADAS may be configured to image an environment of the vehicle 100 (e.g., an environment in which the vehicle 100 is located), generating environmental data. According to an exemplary embodiment, the computing device 125 may be configured to determine the weather of an environment of the vehicle 100 based on data from the one or more sensors and/or receive weather data from one or more internal and/or external sources.

According to an exemplary embodiment, when the vehicle 100 is parked, the reconfigurable solar panel array 105 may be configured to be periodically adjusted to be at the optimal angle 185 for power generation. According to an exemplary embodiment, when the vehicle 100 is in motion, the reconfigurable solar panel array 105 may be configured to only be adjusted when there is a predicted net power gain (i.e., when solar power generation is greater than the energy required to adjust the angle of the reconfigurable solar panel array 105). To achieve this, the computing device 125 may be configured to first check lighting conditions in the area/environment of the vehicle 100. For example, adjusting the angle of the reconfigurable solar panel array 105 may not be warranted when it is very cloudy or it is nighttime, among other suitable scenarios.

According to an exemplary embodiment, when lighting conditions are favorable, the computing device 125 may be configured to check a planned route of the vehicle 100. The route may be divided into trip segments, where the average traveling direction falls within a predetermined threshold. For each trip segment, the computing device 125 may be configured to cause the reconfigurable solar panel array 105 to adjust only when predicted energy generated by the adjusted reconfigurable solar panel array 105 is greater than predicted energy needed to move the reconfigurable solar panel array 105.

While reference is made to an EV truck 100, the reconfigurable solar panel array 105 may be configured to be used with other suitable vehicles. For example, the reconfigurable solar panel array 105 may be linked to a high voltage system as part of a trailer connector interface and/or may be configured to be positioned on a top surface and/or other surface of a travel camper, a flatbed trailer (e.g., a flatbed aluminum trailer), a storage/work trailer, and/or other suitable device/vehicle. According to an exemplary embodiment, the reconfigurable solar panel array 105 may be configured to give electrical support to camper amenities as a user enjoys a campsite, and/or provide provisions for lighting, refrigeration, cooking, water pumps, and/or keeping warm/cool, among other uses. When used with a flatbed aluminum trailer, a lower profile of the reconfigurable solar panel array 105 may provide extra aerodynamic advantage. When used with a storage/work trailer, the reconfigurable solar panel array 105 may provide extra electricity for power tools, charging battery packs, and lighting, among other uses.

According to an exemplary embodiment, the reconfigurable solar panel array 105, the clear outer shell 150, and/or the bending mechanism 155 may be configured to be rotated, in direction 235, by a rotation mechanism 230. The rotation mechanism 230 may be configured to swivel the reconfigurable solar panel array 105 to absorb sunlight energy more efficiently. According to an exemplary embodiment, the rotation mechanism 230 may be configured to rotate the reconfigurable solar panel array 105 towards a direction of the Sun in coordination with peak angles formed by the rolling cylinder 170 and/or other suitable bending mechanism 155.

According to an exemplary embodiment, the rotation mechanism 230 may be powered by motor 120 and/or other suitable motor/power mechanism.

According to an exemplary embodiment, the reconfigurable solar panel array 105, the clear outer shell 150, the bending mechanism 155, and/or the rotation mechanism 230 may comprise a reconfigurable solar panel array system 240. According to an exemplary embodiment, the reconfigurable solar panel array system 240 may comprise computing device 125.

Figure 5:
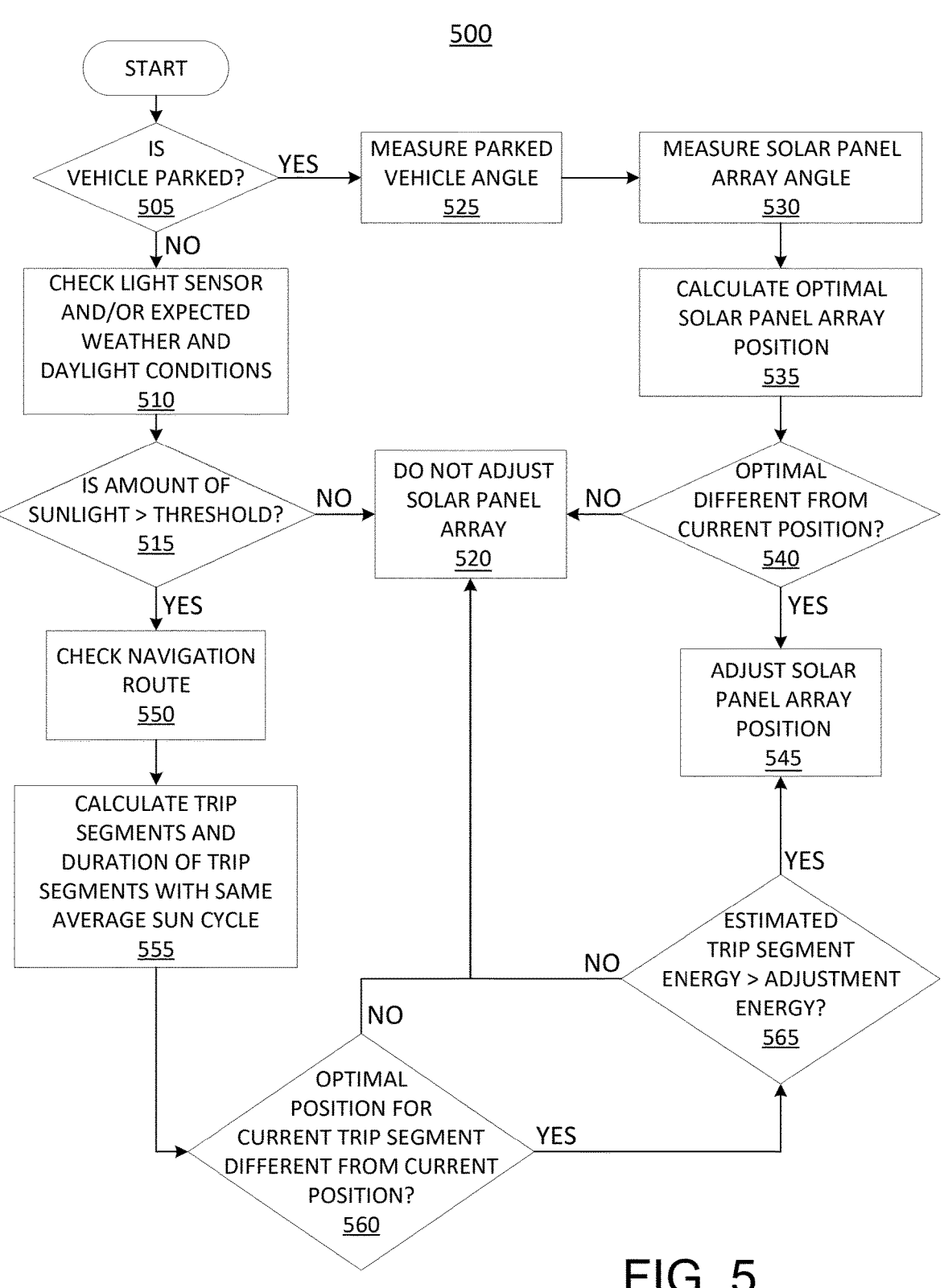
FIG. 5 illustrates a flowchart of a method for reorienting solar panel arrays on in-motion vehicles using energy comparisons, according to an exemplary embodiment of the present disclosure.

Referring now to FIG. 5, a method 500 for reorienting solar panel arrays on in-motion vehicles using energy comparisons is illustratively depicted, in accordance with an exemplary embodiment of the present disclosure.

At 505, it may be determined whether a vehicle (e.g., an EV truck) is parked (i.e., whether or not the vehicle is in motion). According to an exemplary embodiment, it may be determined whether the vehicle is parked based on one or more sensor data points (e.g., a speed of the vehicle, a motion determination of the vehicle, whether the vehicle is in park, etc.) via one or more sensors (e.g., the one or more LiDAR sensors, the one or more radar sensors, the one or more cameras, the one or more position determining sensors, the one or position orientation sensors, the one or more light sensors, and/or the one or more motion sensors, among other suitable sensors).

According to an exemplary embodiment, when the vehicle is parked, then, at 525, a parked vehicle angle may be measured and, at 530, a reconfigurable solar panel array angle may be measured.

According to an exemplary embodiment, the parked vehicle angle and/or the reconfigurable solar panel array angle may be determined using one or more data points measured/captured using the one or more sensors and/or via other suitable means.

At 535, an optimal position of the reconfigurable solar panel array relative to the Sun (i.e., relative to a direction of sunlight) may be calculated. The optimal reconfigurable solar panel array position may be determined based on the parked vehicle angle, the location of the vehicle, the time of day, the time of year, and/or other suitable factors. According to an exemplary embodiment, the optimal position may be a position that maximizes energy generation by the reconfigurable solar panel array.

At 540, it may be determined whether the optimal reconfigurable solar panel array position is different from a current reconfigurable solar panel array position. When the optimal reconfigurable solar panel array position is not different from the current reconfigurable solar panel array position, then, at 520, the position of the reconfigurable solar panel array is not adjusted. When the optimal reconfigurable solar panel array position is different from the current reconfigurable solar panel array position, then, at 545, the position of the reconfigurable solar panel array is adjusted to the optimal position.

According to an exemplary embodiment, when the vehicle is not in park, then, at 510, sunlight conditions may be determined. Sunlight conditions may be determined by, e.g., checking data from the light sensor, and/or checking the expected weather and/or daylight conditions from now to a recapture time, and/or other suitable means. A recapture time is a time for the reconfigurable solar panel array to generate an adjustment energy. An adjustment energy is a predicted maximum amount of power needed to fully adjust the position of the reconfigurable solar panel array (e.g., the energy needed to slide the bending mechanism from one extreme position to the other extreme position). Based on the sunlight conditions, it may be determined, at 515, whether an amount of sunlight is greater than a threshold. According to an exemplary embodiment, the threshold may be a predetermined amount of sunlight (e.g., sunlight that is, on average, 50% occluded and/or other suitable threshold).

When the amount of sunlight is not greater than the threshold, then, at 520, the position of the reconfigurable solar panel array is not adjusted.

When the amount of sunlight is greater than the threshold, then, at 550, a navigation route of the vehicle is checked and, at 555, the route may be divided into calculated trip segments where, for each trip segment, an average traveling direction falls within a predetermined threshold traveling direction. According to an exemplary embodiment, a duration of trip segments with a same average sun cycle may be calculated.

At 560, it may be determined whether an optimal position of the reconfigurable solar panel array for a current trip segment is different from a current position of the reconfigurable solar panel array. According to an exemplary embodiment, determining whether the optimal position of the reconfigurable solar panel array for a current trip segment is different from a current position of the reconfigurable solar panel array may comprise calculating the optimal position of the reconfigurable solar panel array relative to a direction of sunlight. According to an exemplary embodiment, the optimal position of the reconfigurable solar panel array relative to the direction of sunlight may be based on input from the one or more sensors.

When the optimal position of the reconfigurable solar panel array for a current trip segment is not different from a current position of the reconfigurable solar panel array, then, at 520, the position of the reconfigurable solar panel array is not adjusted.

When the optimal position of the reconfigurable solar panel array for a current trip segment is different from a current position of the reconfigurable solar panel array, the, at 565, it may be determined whether an estimated trip segment energy is greater than the adjustment energy. The trip segment energy is a predicted energy that would be generated by the reconfigurable solar panel array at the optimal position during a trip segment.

When the estimated trip segment energy is not greater than the adjustment energy, then, at 520, the position of the reconfigurable solar panel array is not adjusted. When the estimated trip segment energy is greater than the adjustment energy, then, at 545, the position of the reconfigurable solar panel array is adjusted to the optimal position.

Figure 6:
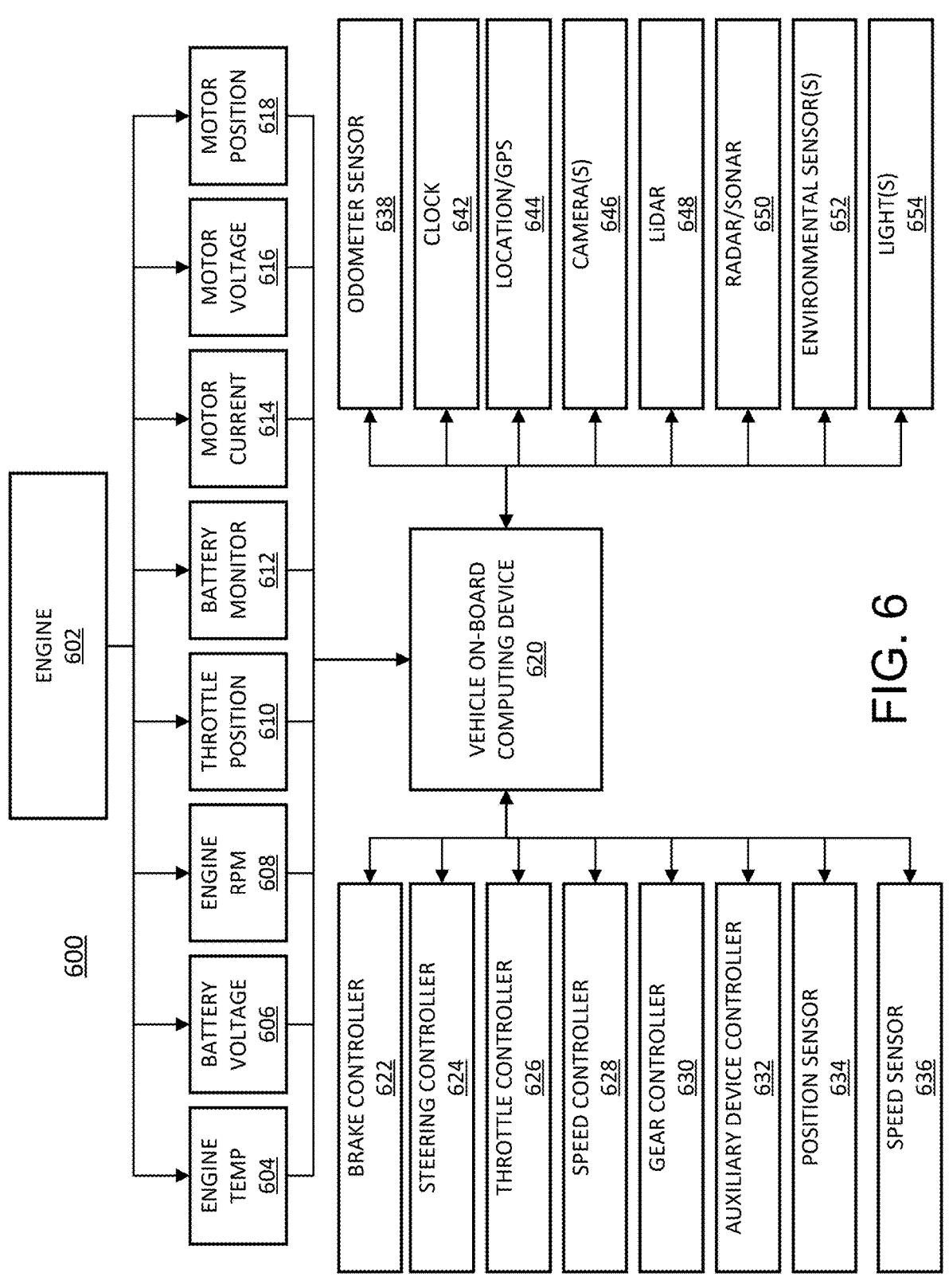
FIG. 6 illustrates an example architecture of a vehicle, according to an exemplary embodiment of the present disclosure.

Referring now to FIG. 6, an example vehicle system architecture 600 for a vehicle is provided, in accordance with an exemplary embodiment of the present disclosure. The following discussion of vehicle system architecture 600 is sufficient for understanding one or more components of EV truck 100.

As shown in FIG. 6, the vehicle system architecture 600 may comprise an engine, motor or propulsive device 602 and various sensors 604-618 for measuring various parameters of the vehicle system architecture 600. In gas-powered or hybrid vehicles having a fuel-powered engine, the sensors 604-618 may comprise, for example, an engine temperature sensor 604, a battery voltage sensor 606, an engine Rotations Per Minute (RPM) sensor 608, and/or a throttle position sensor 610. If the vehicle is an electric or hybrid vehicle, then the vehicle may comprise an electric motor, and accordingly may comprise sensors such as a battery monitoring system 612 (to measure current, voltage and/or temperature of the battery), motor current 614 and voltage 616 sensors, and motor position sensors such as resolvers and encoders 618.

Operational parameter sensors that are common to both types of vehicles may comprise, for example: a position sensor 634 such as an accelerometer, gyroscope and/or inertial measurement unit; a speed sensor 636; and/or an odometer sensor 638. The vehicle system architecture 600 also may comprise a clock 642 that the system uses to determine vehicle time and/or date during operation. The clock 642 may be encoded into the vehicle on-board computing device 620, it may be a separate device, or multiple clocks may be available.

The vehicle system architecture 600 may comprise various sensors that operate to gather information about the environment in which the vehicle is traveling. These sensors may comprise, for example: a location sensor 644 (for example, a Global Positioning System (GPS) device); object detection sensors such as one or more cameras 646; a LIDAR sensor system 648; and/or a radar and/or a sonar system 650. The sensors may comprise environmental sensors 652 such as, e.g., a humidity sensor, a precipitation sensor, a light sensor, and/or ambient temperature sensor. The object detection sensors may be configured to enable the vehicle system architecture 600 to detect objects that are within a given distance range of the vehicle in any direction, while the environmental sensors 652 may be configured to collect data about environmental conditions within the vehicle's area of travel. According to an exemplary embodiment, the vehicle system architecture 600 may comprise one or more lights 654 (e.g., headlights, flood lights, flashlights, etc.).

During operations, information may be communicated from the sensors to an on-board computing device 620 (e.g., computing device 125, computing device 700). The on-board computing device 620 may be configured to analyze the data captured by the sensors and/or data received from data providers and may be configured to optionally control operations of the vehicle system architecture 600 based on results of the analysis. For example, the on-board computing device 620 may be configured to control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers. The brake controller 622 may comprise a pedal effort sensor, pedal effort sensor, and/or simulator temperature sensor, as described herein.

Geographic location information may be communicated from the location sensor 644 to the on-board computing device 620, which may then access a map of the environment that corresponds to the location information to determine known fixed features of the environment such as streets, buildings, stop signs and/or stop/go signals. Captured images from the cameras 646 and/or object detection information captured from sensors such as LiDAR 648 may be communicated from those sensors to the on-board computing device 620. The object detection information and/or captured images may be processed by the on-board computing device 620 to detect objects in proximity to the vehicle. Any known or to be known technique for making an object detection based on sensor data and/or captured images may be used in the embodiments disclosed in this document.

Figure 7:
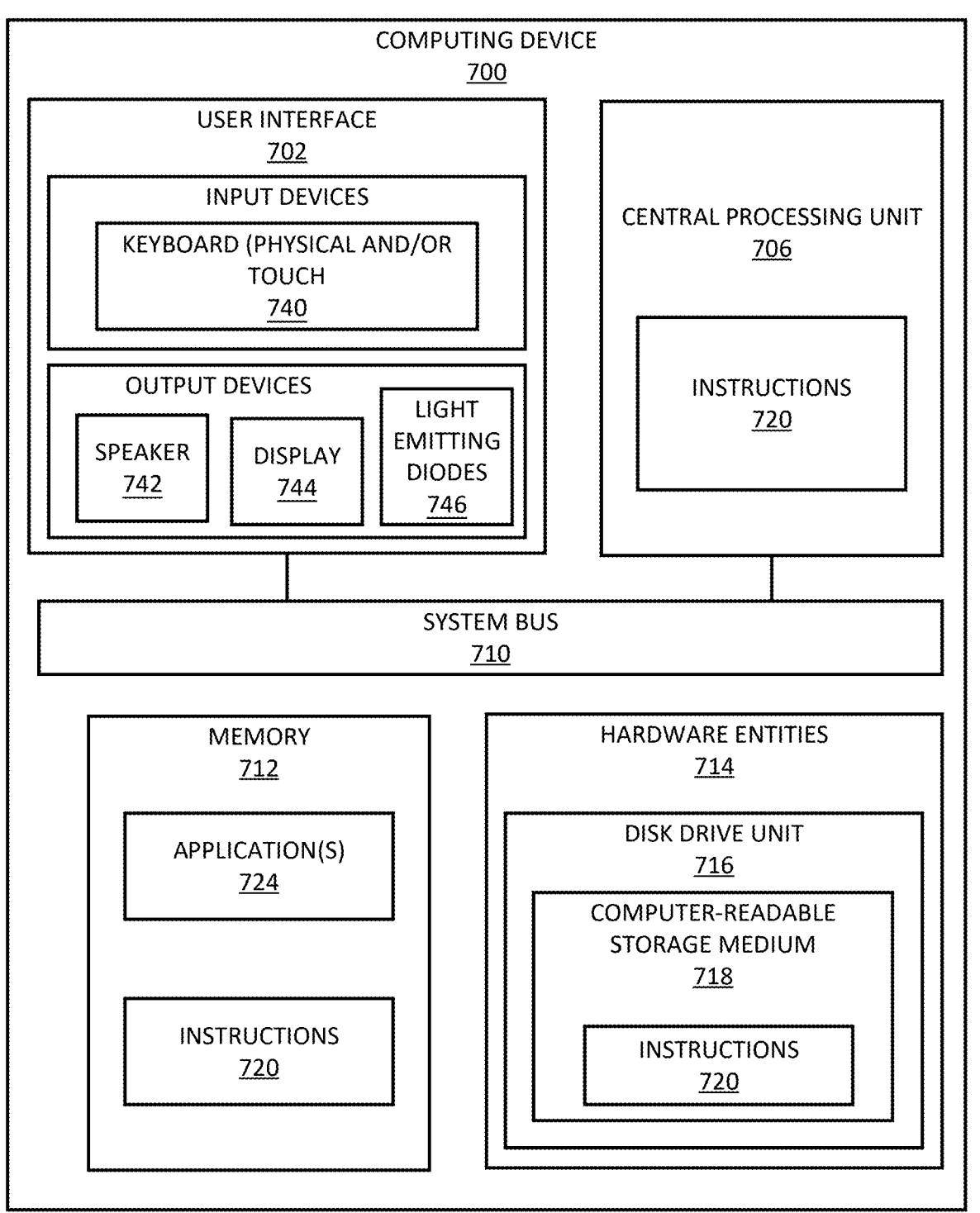
FIG. 7 illustrates example elements of a computing device, according to an exemplary embodiment of the present disclosure.

Referring now to FIG. 7, an illustration of an example architecture for a computing device 700 is provided.

According to an exemplary embodiment, one or more functions of the present disclosure may be implemented by a computing device such as, e.g., computing device 700 or a computing device similar to computing device 700. Computing device 700 may be a quantum computer, a classical computer, and/or have one or more components configured to perform one or more quantum and/or classical computing functions. Computing device 125 and/or computing device 620 may be an example of computing device 700 and/or may comprise one or more components of computing device 700.

The hardware architecture of FIG. 7 represents one example implementation of a representative computing device configured to implement at least a portion of the systems/devices (e.g., EV truck 100 and reconfigurable solar panel array system 240) and method(s)/control logic(s) (e.g., method 500) described herein.

Some or all components of the computing device 700 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 7, the computing device 700 may comprise a user interface 702 (e.g., a graphical user interface ("CPU") 706, a system bus 710, a memory 712 connected to and accessible by other portions of computing device 700 through system bus 710, and hardware entities 714 connected to system bus 710. The user interface may comprise input devices and output devices, which may be configured to facilitate user-software interactions for controlling operations of the computing device 700. The input devices may comprise, but are not limited to, a physical and/or touch keyboard 740. The input devices may be connected to the computing device 700 via a wired or wireless connection (e.g., a Bluetooth® connection). The output devices may comprise, but are not limited to, a speaker 742, a display 744, and/or light emitting diodes 746.

At least some of the hardware entities 714 may be configured to perform actions involving access to and use of memory 712, which may be a Random Access Memory (RAM), a disk driver and/or a Compact Disc Read Only Memory (CD-ROM), among other suitable memory types. Hardware entities 714 may comprise a disk drive unit 716 comprising a computer-readable storage medium 718 on which may be stored one or more sets of instructions 720 (e.g., programming instructions such as, but not limited to, software code) configured to implement one or more of the methodologies, procedures, or functions described herein. The instructions 720 may also reside, completely or at least partially, within the memory 712 and/or within the CPU 706 during execution thereof by the computing device 700.

The memory 712 and the CPU 706 may also constitute machine-readable media. The term "machine-readable media", as used here, refers to a single medium or multiple media (e.g., a centralized or distributed database, and/or associated caches and servers) that store the one or more sets of instructions 720. The term "machine-readable media", as used here, also refers to any medium that is capable of storing, encoding, or carrying a set of instructions 720 for execution by the computing device 700 and that cause the computing device 700 to perform any one or more of the methodologies of the present disclosure.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A reconfigurable solar panel array system of a vehicle, comprising:
   a reconfigurable solar panel array mounted on the vehicle and comprising one or more solar panels,
      wherein the reconfigurable solar panel array:
         is secured at a first end and secured at a second end, and
         is configured to charge a battery of a vehicle;
   a bending mechanism configured to physically adjust an orientation of the reconfigurable solar panel array relative to a direction of sunlight; and
   a computing device, comprising a processor and a memory, wherein the memory is configured to store instructions that, when executed by the processor, cause the processor to:
      when the vehicle is in motion, determine whether an amount of sunlight is above a threshold;
      when the amount of sunlight is above the threshold, determine a navigation route of the vehicle and divide the navigation route into a plurality of trip segments; and
      for each of the plurality of trip segments:
         predict a first amount of energy expected to be generated by the reconfigurable solar panel array when the reconfigurable solar panel array is adjusted to an optimal orientation with respect to the direction of sunlight for the trip segment;
         predict a second amount of energy required to mechanically actuate the bending mechanism to adjust the reconfigurable solar panel array to the optimal orientation; and
         compare the first amount of energy and the second amount of energy to determine a first net energy gain associated with adjusting the reconfigurable solar panel array; and
      control the bending mechanis n to physically adjust the orientation of the reconfigurable solar panel array during vehicle motion only when the first net energy gain is positive;
      wherein electrical energy generated by the reconfigurable solar panel array is supplied to charge the battery of the vehicle.

2. The reconfigurable solar panel array system of claim 1, further comprising a clear outer shell configured to encase the reconfigurable solar panel array.

3. The reconfigurable solar panel array system of claim 1, wherein:
   the bending mechanism comprises:
   a cylinder positioned under the reconfigurable solar panel array; and
   an actuator configured to move the cylinder between the first end and the second end to physically adjust the orientation of the reconfigurable solar panel array relative to the direction of sunlight.

4. The reconfigurable solar panel array system of claim 1, wherein the instructions, when executed by the processor, are further configured to cause the processor to determine whether the vehicle is in motion.

5. The reconfigurable solar panel array system of claim 1, wherein the optimal orientation of the reconfigurable solar panel array relative to the direction of sunlight is based on input from one or more sensors coupled to the vehicle.

6. The reconfigurable solar panel array system of claim 5, wherein the one or more sensors are selected from the group consisting of:
   one or more LiDAR sensors;
   one or more radar sensors;
   one or more cameras;
   one or more position determining sensors;
   one or position orientation sensors;
   one or more light sensors; and
   one or more motion sensors.

7. The reconfigurable solar panel array system of claim 1, wherein, for each of the plurality of trip segments, an average traveling direction falls within a predetermined threshold traveling direction.

8. The reconfigurable solar panel array system of claim 1, further comprising a rotation mechanism configured to rotate the reconfigurable solar panel array.

9. The reconfigurable solar panel array system of claim 1, further comprising the vehicle.

10. The reconfigurable solar panel array system of claim 9, wherein:
the vehicle is an electric vehicle truck (EV truck), and
the solar panel array is positioned on a truck bed cap of the EV truck.

11. A method for reorienting solar panel arrays of a vehicle, comprising:
when a vehicle is in motion, determining, using a computing device comprising a processor and a memory, whether an amount of sunlight is above a threshold;
when the amount of sunlight is above the threshold, determining a navigation route of the vehicle and dividing the navigation route into a plurality of trip segments; and
for each of the plurality of trip segments:
predicting a first amount of energy expected to be generated by a reconfigurable solar panel array when the reconfigurable solar panel array is adjusted to an optimal orientation relative to a direction of sunlight for the trip segment;
wherein the reconfigurable solar panel array:
is mounted on the vehicle
comprises one or more solar panels,
is secured at a first end and secured at a second end, and
is configured to charge a battery of the vehicle;
predicting a second amount of energy required to mechanically actuate a bending mechanism to adjust the reconfigurable solar panel array to the optimal orientation;
comparing the first amount of energy and the second amount of energy to determine a first net energy gain associated with adjusting the reconfigurable solar panel array;
controlling the bending mechanism to physically adjust the orientation of the reconfigurable solar panel array during vehicle motion only when the first net energy gain is positive; and
supplying electrical energy generated by the reconfigurable solar panel array to charge the battery of the vehicle.

12. The method of claim 11, wherein+the bending mechanism comprises:
a cylinder positioned under the reconfigurable solar panel array; and
an actuator configured to move the cylinder between the first end and the second end to physically adjust the orientation of the reconfigurable solar panel array relative to the direction of sunlight.

13. The method of claim 1, further comprising determining, using the computing device, whether the vehicle is in motion.

14. The method of claim 11, wherein the optimal orientation of the reconfigurable solar panel array relative to the direction of sunlight is based on input from one or more sensors coupled to the vehicle.

15. The method of claim 14, wherein the one or more sensors are selected from the group consisting of:
one or more LiDAR sensors;
one or more radar sensors;
one or more cameras;
one or more position determining sensors;
one or position orientation sensors;
one or more light sensors; and
one or more motion sensors.

16. The method of claim 11, wherein, for each of the plurality of trip segments, an average traveling direction falls within a predetermined threshold traveling direction.

17. The method of claim 11, wherein:
the vehicle is an electric vehicle truck (EV truck), and
the solar panel array is positioned on a truck bed cap of the EV truck.

18. The reconfigurable solar panel array system of claim 4, wherein the instructions, when executed by the processor, are further configured to, when the vehicle is not in motion, cause the processor to:
predict a third amount of energy expected to be generated by the reconfigurable solar panel array when the reconfigurable solar panel array is adjusted to the optimal orientation to the direction of sunlight;
predict a fourth amount of energy required to mechanically actuate the bending mechanism to adjust the reconfigurable solar panel array to the optimal orientation;
compare the third amount of energy and the fourth amount of energy to determine a second net energy gain associated with adjusting the reconfigurable solar panel array; and
control the bending mechanism to physically adjust the orientation of the reconfigurable solar panel array during vehicle motion only when the second net energy gain is positive.

19. The method of claim 13, further comprising, using the computing device:
predicting a third amount of energy expected to be generated by the reconfigurable solar panel array when the reconfigurable solar panel array is adjusted to the optimal orientation to the direction of sunlight;
predicting a fourth amount of energy required to mechanically actuate the bending mechanism to adjust the reconfigurable solar panel array to the optimal orientation; and
comparing third first amount of energy and fourth second amount of energy to determine a second net energy gain associated with adjusting the reconfigurable solar panel array.

20. The method of claim 19, further comprising controlling the bending mechanism to physically adjust the orientation of the reconfigurable solar panel array only when the second net energy gain is positive.

* * * * *